United States Patent Office 3,552,104
Patented Jan. 5, 1971

3,552,104
TWO-STAGED COMPRESSION OF A SEALING GASKET
Walter Bruce Wood, Bridgeville, Pa., assignor, by mesne assignments, to American Air Filter Company, Inc., a corporation of Delaware
Filed Oct. 7, 1968, Ser. No. 765,403
Int. Cl. F24f 3/16; E04b 1/92
U.S. Cl. 55—502                                    4 Claims

ABSTRACT OF THE DISCLOSURE

A support and a panel assembly includes an elongated member having two thickness dimensions which provide a thick lip and a thin lip. The panel assembly comprises a panel having an upper and a lower surface on which a resilient closed-cell sealing gasket is bonded to the perimeter of one of the surfaces with the gasket engageable with the thick lip and the thin lip of the elongated member. A clamping means for biasing the panel and the elongated member together causes a two-staged compression of the sealing gasket. Thus, a zone of greater compression of the gasket occurs between the thick lip and the surface of the panel and a zone of lesser compression of the gasket occurs between the thin lip and the surface of the panel. Should particulate matter diffuse through the gasket at the zone of greater compression because of the deterioration of the sealing integrity of the gasket, then the particulate matter will be excluded from passing through the gasket at the zone of lesser compression.

BACKGROUND OF THE INVENTION

Figure 1:
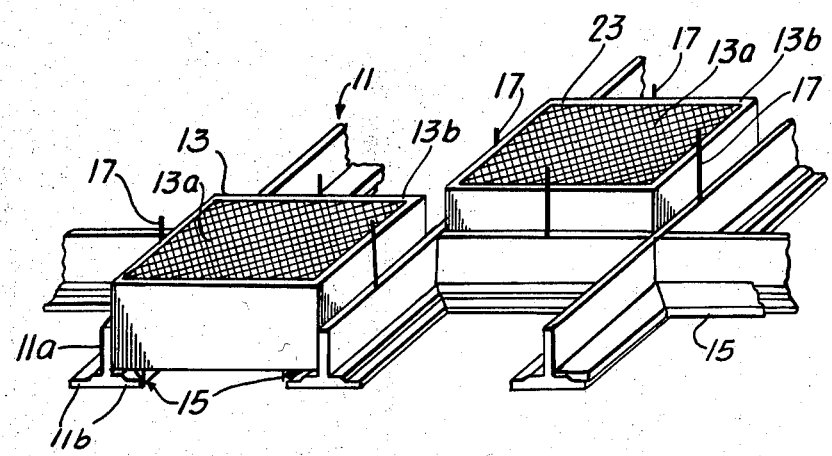

This invention relates to a support and a panel assembly and more particularly to a support providing for the compression of a sealing gasket in two different stages.

Particularly, in controlled environment rooms a plurality of panels are situated in a suspended ceiling and supported upon a plurality of supports. Usually, the panel is an air filter whose function is to remove particulate matter from the air entering the room through the filter.

A sealing gasket composed of a resilient, closed-cell rubber or the like is disposed between the panel and the support and is adhesively bonded to the base of the panel along its perimeter; the panel with the sealing gasket is secured to the support with a clamping means in order to assure a sealed joint.

Heretofore, the necessity for providing a sealed joint in order to exclude particulates of air from entering the room between the panel and the support required the use of clamping means to urge the panel and the support together, which compressed the sealing gasket, to assure proper seating of the gasket on the support. Because of the dimensional irregularities of the support and of the panel, the compression of the sealing gasket was not uniform; often the gasket was severely compressed in some regions along the support while in other regions, the gasket was seated improperly.

Over a period of time, the ability of the sealing gasket to exclude particulates from the air, if excessively compressed, deteriorated because of the failure of the closed-cells within the gasket. Efforts to overcome this problem of the deterioration of the sealing gasket resulted in reducing the compression of the sealing gasket by relieving the load exerted by the clamping means; however, this solution proved ineffective because certain regions of the gasket and the support would not then properly seat and again the function of the gasket to sustain a sealed joint was not maintained.

SUMMARY OF THE INVENTION

The present invention contemplates a support and a panel assembly comprising an elongated member having two thickness dimensions which provide a thick lip and a thin lip; a panel having an upper and lower surface; a resilient, closed-cell sealing gasket bonded to one of the surfaces of the panel; and a clamping means for urging the panel and the support together to assure a sealed joint. A two-staged compression of the gasket occurs when the panel and the support are urged together by the clamping means where a zone of greater compression of the gasket occurs between the thick lip and surface of the panel and where a zone of lesser compression of the gasket occurs between the thin lip and the surface of the panel. Should particulate matter diffuse through the gasket at the zone of greater compression, then the particulate matter will be excluded from passing through the gasket at the zone of lesser compression where fracture of the closed-cells does not occur.

For a further understanding of the invention and for advantages and features thereof, reference may be made to the following description in conjunction with the drawings which show, for the purpose of exemplification, embodiments of the invention.

GENERAL DESCRIPTION OF THE DRAWINGS

Figure 2:
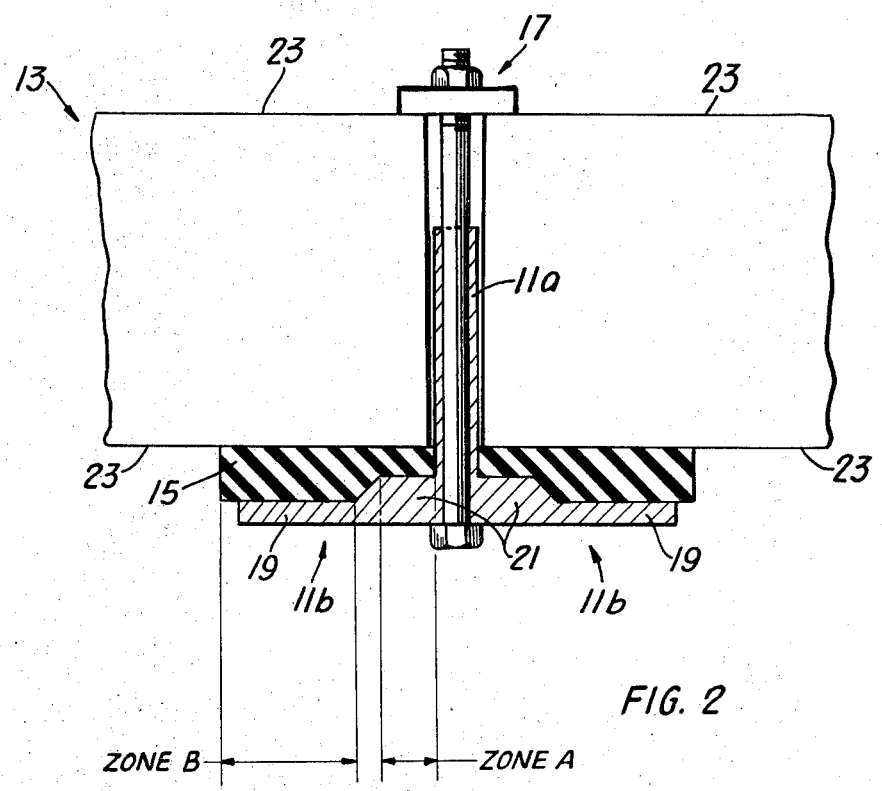

In the drawings:

FIG. 1 illustrates an isometric, partially cutaway, view of the present invention in a suspended ceiling where supports intersect each other to form a gridwork with the panels resting on the supports; and FIG. 2 is a cross-sectional view illustrating the support embodying the present invention with two partially cutaway panels resting thereon.

DETAILED DESCRIPTION

FIG. 1 illustrates an embodiment of the invention comprising the supports 11, the panels 13 resting on the supports 11, the resilient sealing gaskets 15 between the supports 11 and the panels 13 and the clamping means 17 urging the panels 13 and the supports 11 together.

The supports 11 being elongated members are conventionally a component of a suspended ceiling where hangers or the like suspend the supports 11 from the ceiling, and generally intersect each other defining a rectangular gridwork. The present invention, however, may be used either with a suspended ceiling or with a vertical wall comprising the supports 11.

The support 11 comprises a stem 11a with flanges 11b depending from one end of the stem 11a, defining a channel having an inverted T-shaped cross section as shown in FIGS. 1 and 2. On the support 11, having the inverted T-shaped cross section, two individual panels 13 may engage the flanges 11b of one support 11 as shown in FIG. 2. Nonetheless, other shaped supports may be envisioned such as a support having an L-shaped cross section where only one panel engages the support.

The supports 11 have two thickness dimensions which provide a thin lip 19 and a thick lip 21 of the flanges 11b. The necessity of a thin lip 19 and a thick lip 21 will be discussed later.

The panel 13 is generally rectangular having an upper and lower surface 23 thereon so as to engage the flanges 11b of the support 11 Typically, the panel 13 is an air filter comprising a suitable filter media 13a to exclude particulate matter, which media 13a is enclosed within a wooden frame 13b for support. Those skilled in the art commonly use a HEPA Filter (meaning high-efficiency, particulate, air). The HEPA Filter is sold by a variety of manufacturers under various trademarks; a typical product air filter is manufactured by American Air Filter Co., Inc., and is sold under the trademark of Astrocel. Manufacturers of the HEPA Filter guarantee an efficiency of 99.93% of the removal of particulate matter from the air passing through the filter. Efficiency of this order of magnitude for an air filter demands that the filter media must be free of flaws or imperfections and impervious to particulate leakage.

Similarly, the sealing gasket 15 must prevent particulate leakage. The sealing gasket is composed of a closed-cell, resilient material having a plurality of tiny cells therein to prevent particulate leakage therethrough. Of the many materials that are available closed-cell neoprene rubber excellently excludes particulate matter to a greater extent than solid resilient materials; however, solid materials, such as solid rubber, may be used. To further prevent particulate leakage, the sealing gasket 15 may be adhesively bonded with a suitable adhesive, to the perimeter of the surface 23 of the panel 13. The HEPA Filter is usually received from the manufacturer with the sealing gasket 15 already adhesively bonded to the panel member 13. Because the present invention does not require the use of air filters any suitable panel where little or no particulate leakage between the joint of the panel 13 and the support 11 is required may be used with the present invention.

Because of the dimensional imperfections of panel 13 and of the support 11, clamping means 17 are necessary to form a sealed joint; the clamping means 17 provides the load necessary for proper seating of the gasket 15, whereby the gasket is compressed from its original volume. Further, the clamping means 17 cause the support 11 to bend and conform to the surface 23 of the panel 13. Any suitable clamping means will suffice such as a C-clamp or a nut and bolt arrangement.

In some regions along the flanges 11b, the gasket 15 is excessively compressed by the clamping means 17, resulting in the eventual deterioration with time of the ability of the sealing gasket 15 to exclude particulate matter from the air. As is well known, if a closed-cell gasket is excessively compressed, over a period of time, individual cells within the gasket eventually fracture; thus, particulate matter may pass through the gasket and the sealing integrity of the gasket is not maintained. On the other hand, if the load exerted by the clamping means 17 is relieved to avoid the fracturing of the individual cells within the gasket, then certain regions of the gasket 15 along the flanges 11b may not properly seat and again the function of the gasket to sustain a sealed joint is not maintained.

These two opposing forces, excessive compression and improper seating of the sealing gasket, are reconciled by the provision of a thin lip 19 and a thick lip 21 on the flanges 11b of the support 11. It is readily observable that these two thickness dimensions of the support 11 allow proper seating of the sealing gasket on the thick lip 21 while at the same time alleviate the problem of excessive compression of the sealing gasket 15 by the thin lip 19. Any suitable means for providing these two thickness dimensions of the support are satisfactory for the purpose of this invention. The embodiment, shown in FIGS. 1 and 2, has the two thickness dimensions, providing the thin lip 19 and the thick lip 21, conveniently integral with the support 11. It is satisfactory to use a support of one thickness dimension and to provide the thick lip by installing on the support a flat wedge or the like.

Nor is it essential for the purposes of this invention that the arrangement of the thin lip 19 and the thick lip 21 conform exactly to the drawings. It is acceptable if the thick lip 21 and the thin lip 19 are reversed, i.e., the thick lip 21 would sit on the outside of the flanges 11b with the thin lip 19 on the inside of the flanges 11b.

The region along the support where the gasket may be excessively compressed, is designated in FIG. 2 as Zone A, the zone of greater compression. In Zone A, if the deformation of the gasket exceeds its limit where individual cells of the gasket fracture, then the sealing integrity of the gasket 15 deteriorates with time. The percent of deformation that the gasket may sustain before integrity is reduced is dependent upon the type of material of which the gasket is composed. With neoprene rubber, for example, the percentage of deformation should not exceed approximately 25% of the original volume. Other suitable closed-cell materials may be used which have their own characteristic limitations on the amount of deformation which may be tolerated before sealing integrity deteriorates with time.

Zone B, the zone of lesser compression, in FIG. 2 is the region in which a minimum amount of deformation of the gasket occurs as compared to Zone A; the gasket sustains its sealing integrity in this region because the gasket 15 is not compressed beyond its limit where individual cells within the gasket fracture.

The width of the bevel or the distance from Zone A to Zone B is not critical in this invention. However, a suitable slope of the bevel should be selected to avoid distortion of the gasket.

Thus, the panel assembly comprising the panel 13 and the sealing gasket 15 is positioned upon the support 11, where the sealing gasket 15 engages both the thin lip 19 and the thick lip 21 of the support 11. It may be desirable to apply an adhesive to bond the gasket 15 to the support 11 to assure a sealed joint; however, the use of an adhesive would practically eliminate the need for clamping devices. On the other hand, the use of an adhesive would not render the panel 13 readily demountable from the support 11. The panel 13 and the support 11 may then be biased together by the clamping means 17 to obtain proper seating of the sealing gasket 15 upon the thick lip 21. If the sealing gasket in Zone A of FIG. 2 is excessively compressed, as a result of urging the panel 13 and the support 11 together, then diffusion of particulate matter may occur in this region. The particulate matter will be excluded or stopped from passing through the sealing gasket 15, where the individual, closed-cells of the gasket have not been appreciably fractured in Zone B.

Therefore, the more important dimension of the support 11 is the depth of the bevel on the flanges 11b or the difference between the thin lip 19 to the surface of the panel 23 and the thick lip 21 to the surface of the panel 23. This difference depends on several factors; namely, the thickness of the sealing gasket, the amount of deformation that the gasket may safely sustain before loss of sealing integrity, and the strength requirements of the support.

For example, with a sealing gasket composed of a closed-cell neoprene rubber having a thickness dimension of ¼" and capable of sustaining approximately 25% compression of the original volume, the dimensions for the support computed to be practical are:

1/16" for the thickness of the thin lip 19;

1/8" for the thickness of the thick lip 21;

thus, 1/16" for the bevel, providing at least 1/16" greater distance from the surface of the panel 23 to the support 11. Hence, at the thick lip 21 with the above dimensions, the sealing gasket 15 could be compressed by approximately 50% of the original volume at Zone A, with only 25% compression occurring at Zone B, with no loss of sealing integrity. Without the invention, the sealing gasket 15 could be compressed by only approximately 25% of the original volume with no loss of sealing integrity.

Thus, the invention teaches a support of selected dimensions which, regardless of the amount of compression of the sealing gasket, assures the sealing integrity of the gasket by providing a zone where lesser deformation of the gasket occurs and a zone where excessive deformation may occur while maintaining a sealed joint between the support and the panel that is impervious to particulate leakage. That portion of the sealing gasket subjected to the greater amount of compression where the individual cells of the gasket fracture is sacrificed to force alignment of the support with the panel while a portion of the gasket under the lesser amount of compression where the individual cells of the gasket do not fracture assures a sealed joint between the panel and the support.

What is claimed is:

1. A support and filter panel assembly comprising:
   (a) an elongated support member having two thickness dimensions providing a thick lip and a thin lip, said thin lip being adjacent and extending to the outside extremity of said support:
   (b) a filter panel having an upper and lower surface thereon;
   (c) a resilient, closed-cell sealing gasket bonded to the perimeter of one of the surfaces; and
   (d) a clamping means for urging the panel and the support together so that a two-staged compression of the gasket provides a zone of greater compression of the gasket between the thick lip and the surface of the panel, and a zone of lesser compression of the gasket between the thin lip and the surface of the panel, whereby should particulate matters diffuse through the gasket at the zone of greater compression said particulate matter will be excluded from passing through the gasket at the zone of lesser compression.

2. A support and filter panel assembly comprising:
   (a) an elongated support member having two thickness dimensions providing a thin lip and a thick lip, said thin lip being adjacent and extending to the outside extremity of said support;
   (b) a filter panel with an upper and a lower surface thereon;
   (c) a clamping means urging said panel and said elongated support member together;
   (d) a resilient closed-cell sealing gasket between one of the surfaces of the panel and the thick lip and the thin lip of the elongated support member, resulting in a two-staged compression of the gasket with a zone of greater compression of the gasket between the thick lip and the surface of the panel and a zone of lesser compression of the gasket between the thin lip and the surface of the panel;
   (e) whereby should particulate matter diffuse through the zone of greater compression, the particulate matter will be excluded from passing through the zone of lesser compression of the gasket.

3. The apparatus of claim 2 wherein said elongated support member comprises:
   (a) a stem with two flanges oppositely apart and depending from one end of the stem, defining a channel having an inverted T-shaped cross section;
   (b) each of said flanges being capable of supporting a panel at one of the surfaces of the panel whereby the elongated member is capable of simultaneously supporting two panels.

4. In a suspended ceiling wherein a filter panel rests on a resilient closed-cell sealing gasket which in turn rests on an elongated support member and a clamp urges the panel and the support member together and compresses the gasket, the improvement wherein;
   said elongated support member has an outside thin lip and an inside thick lip providing for compression of the gasket in two different stages, one stage providing greater compression of the gasket between the thick lip and the panel and the other stage providing lesser compression of the gasket between the thin lip and the panel;
   whereby any diffusion of particulate matter through the stage of greater compression due to fracture of the closed-cells therein will be stopped at the stage of lesser compression of the gasket where the closed-cells in this stage are not appreciably fractured.

References Cited

UNITED STATES PATENTS

| | | | |
|---|---|---|---|
| 2,691,352 | 10/1954 | Bowden | 52—395 |
| 3,028,938 | 4/1962 | Schorr | 52—495X |
| 3,173,228 | 3/1965 | Roberts | 52—464X |
| 3,350,862 | 11/1967 | Nutting | 52—494X |

PRICE C. FAW, JR., Primary Examiner

U.S. Cl. X.R.

52—403, 495, 499; 98—40